(12) United States Patent
Liu et al.

(10) Patent No.: US 9,572,054 B2
(45) Date of Patent: Feb. 14, 2017

(54) REALIZATION METHOD, APPARATUS AND SYSTEM FOR REMOTE MONITORING

(75) Inventors: Jianliang Liu, Shenzhen (CN); Samuel Han Siong Chia, Shenzhen (CN); Zhenghua Luo, Shenzhen (CN); Yingzhe Zhang, Shenzhen (CN); Yan Xu, Shenzhen (CN)

(73) Assignee: Hytera Communications Corp., Ltd., Shenzhen, Guangdong (CN)

( * ) Notice: Subject to any disclaimer, the term of this patent is extended or adjusted under 35 U.S.C. 154(b) by 343 days.

(21) Appl. No.: 14/114,026

(22) PCT Filed: Apr. 27, 2011

(86) PCT No.: PCT/CN2011/073365
§ 371 (c)(1),
(2), (4) Date: Oct. 25, 2013

(87) PCT Pub. No.: WO2012/145898
PCT Pub. Date: Nov. 1, 2012

(65) Prior Publication Data
US 2014/0050100 A1  Feb. 20, 2014

(51) Int. Cl.
G01R 31/08 (2006.01)
H04W 24/06 (2009.01)
(Continued)

(52) U.S. Cl.
CPC ........... H04W 24/06 (2013.01); H04L 67/125 (2013.01); H04W 4/10 (2013.01); H04L 67/325 (2013.01); H04W 4/22 (2013.01)

(58) Field of Classification Search
CPC .......... H04W 24/06; H04W 4/10; H04W 4/22; H04L 67/125; H04L 67/325
(Continued)

(56) References Cited

U.S. PATENT DOCUMENTS 7,613,287 B1 * 11/2009 Stifelman ......... H04M 3/42017
  379/201.01
2010/0099420 A1 * 4/2010 Chowdhary ........ H04W 72/005
  455/450
2012/0108212 A1  5/2012 Zhao

FOREIGN PATENT DOCUMENTS

CN  1538778 A  10/2004
CN  201608749 U  10/2010
(Continued)

OTHER PUBLICATIONS

International Search Report dated Feb. 16, 2012 from corresponding International Application No. PCT/CN2011/073365.
(Continued)

Primary Examiner — Peter Cheng
(74) Attorney, Agent, or Firm — Wolf, Greenfield & Sacks, P.C.

(57) ABSTRACT

A realization method, apparatus and system for remote monitoring, the remote monitoring technique is used between interphones, which includes the following contents: a monitored party receives a remote monitoring request from a monitoring party, the remote monitoring request includes a target control information; the monitored party answers confirming information to the monitoring party after receiving the remote monitoring request successfully, and analyzes the target control information, and then selects transmission mode; the monitored party enters monitored state, starts transmission automatically, and implements the transmission according to the selected transmission mode. Applying the embodiments of the present invention, the remote monitoring function of a interphone will be improved, and the monitoring party can initiatively control the transmission time of the monitored party; or transmission interval and times of the monitored party, so as to realize the repeat monitoring is realized. Furthermore, the target control infor-
(Continued)

mation of the present invention is not set completely by Customer Program Software (CPS), it also can be set according to the human-computer interface operation, the transmission time of the monitored party is controlled agilely.

10 Claims, 8 Drawing Sheets

(51) Int. Cl.
  *H04L 29/08* (2006.01)
  *H04W 4/10* (2009.01)
  *H04W 4/22* (2009.01)
(58) Field of Classification Search
  USPC .......................................................... 370/241
  See application file for complete search history.

(56) References Cited

FOREIGN PATENT DOCUMENTS

| CN | 101909325 A | 12/2010 |
| CN | 101938761 A | 1/2011 |

OTHER PUBLICATIONS

Extended European Search Report dated Mar. 17, 2015 and European Search Opinion from corresponding European Application No. 11864214.

\* cited by examiner

REALIZATION METHOD, APPARATUS AND SYSTEM FOR REMOTE MONITORING

FIELD OF THE INVENTION

The present invention relates to a communication system, and in particular to a method, a device and a system for implementing a remote monitoring.

BACKGROUND OF THE INVENTION

In using interphones, a remote monitoring function of the interphone may be used to monitor conditions around the target interphone so as to take corresponding actions in occasions that, for example, a call initiating party (who has a corresponding manager privilege) wants to know conditions of the called party, i.e., the monitored side, without being noticed when the called party does not respond to the call; or a missed or stolen interphone needs to be found; or a target interphone used by a user who is in danger needs to be tracked in real time.

For this remote monitoring function, the initiator transmits a remote monitoring instruction to the target interphone; the target interphone, after receiving the remote monitoring instruction, activates a microphone and a push to talk (PPT) button automatically, and meanwhile initiates a secret call to the sender of the instruction automatically for a certain time period, without any transmitting indication on the target interphone, so the target user does not know the transmission. In this case, all the sound (voice or background noise) produced around the target interphone is transmitted secretly.

The implementation procedure according to the existing interphone remote monitoring technique is as follows. A monitored time period (i.e., a transmit time) of the target interphone is firstly set via a customer program software (CPS). Then interaction between the monitoring side and the monitored side is performed via a control signaling block (CSBK) based on the digital mobile radio (DMA) protocol. Specifically, a remote user, i.e., the monitoring side, transmits a remote monitoring instruction to a target interphone; the target interphone, after receiving the remote monitoring instruction, replies acknowledgement (ACK) information to the initiator of the instruction, i.e., the monitoring side, starts to transmit secretly for one time for a fixed time period previously set via the CPS, and exits the monitored state when the transmit time expires.

There are at least the following disadvantages in the existing remote monitoring 1. The target interphone exits the monitored state and the whole process ends after the time period during which the target interphone is monitored (i.e., the transmit time) expires. The transmitting cannot be started automatically after a certain time interval and repeated for a certain times. Therefore, it cannot satisfy the requirement that the monitored side needs to automatically report its background to the monitoring side in some application scenarios.

2. The time period during which the target interphone is monitored (i.e., the transmit time) is set to be a fixed time period via the CPS. The set time period cannot be changed when using, and the set time period needed to be changed must be reset via the CPS. It can be seen that the time period for monitoring is not decided by the monitoring side but by the monitored side, which lacks flexibility. In practical application, the monitoring side needs to decide the time period for monitoring the monitored side based on an actual situation.

SUMMARY OF THE INVENTION

A method for implementing a remote monitoring between interphones is provided according to an embodiment of the present invention. The method is performed by a monitored side and includes:

receiving a remote monitoring request from a monitoring side, where the remote monitoring request includes target control information;

replying acknowledgement information to the monitoring side, analyzing the target control information, and selecting a transmitting mode; and entering a monitored state, starting automatically a transmission and transmitting according to the selected transmitting mode.

The target control information includes a transmit interval, and the analyzing the target control information and selecting a transmitting mode includes:

analyzing the target control information and acquiring the transmit interval by the monitored side;

judging whether the transmit interval is 0, selecting a first transmitting mode as a current transmitting mode in a case that the transmit interval is 0, and selecting a second transmitting mode as the current transmitting mode in a case that the transmit interval is not 0.

In a case that the first transmitting mode is selected as the current transmitting mode, a transmit time is acquired from the target control information; and the transmitting according to the selected transmitting mode includes:

transmitting a sound;

recording a transmitting duration; and judging whether the transmitting duration reaches the transmit time contained in the target control information, ending the current transmission in a case that the transmitting duration reaches the transmit time contained in the target control information, and waiting and ending the current transmission when the transmitting duration reaches the transmit time contained in the target control information in a case that the transmitting duration does not reach the transmit time contained in the target control information.

In a case that the second transmitting mode is selected as the current transmitting mode, the transmit interval and a repeat times are acquired from the target control information; and the transmitting according to the selected transmitting mode includes:

i) transmitting a sound;

ii) recording a transmitting duration;

iii) judging whether the current transmitting duration reaches a preset first threshold, performing step iv) in a case that the current transmitting duration reaches the preset first threshold, and waiting and performing step iv) when the current transmitting duration reaches the preset first threshold in a case that the current transmitting duration does not reach the preset first threshold;

iv) judging whether the repeat times is not equal to 0, ending in a case that the repeat times is equal to 0, and performing step v) in a case that the repeat times is not equal to 0;

v) adding a current transmitting times by 1 to obtaining a value of a transmitting times, judging whether the value of the transmitting times obtained is greater than or equal to the repeat times, ending in a case that the value of the transmitting times obtained is greater than or equal to the repeat times, and performing step vi) in a case that the value of the transmitting times obtained is not greater than or equal to the repeat times;

vi) starting to transmit a sound again after waiting for a time period indicated by the transmit interval, and performing step vii); and vii) judging whether the current transmitting duration reaches the preset first threshold, performing step v) in a case that the current transmitting duration reaches the preset first threshold, and waiting and performing step v) when the current transmitting duration reaches the preset first threshold in a case that the current transmitting duration does not reach the preset first threshold.

Another method for implementing a remote monitoring between interphones is further provided according to an embodiment of the present invention. The method is performed by a monitoring side and includes:

transmitting a remote monitoring request, where the remote monitoring request includes target control information;

receiving acknowledgement information replied by a monitored side and entering a monitoring state; and receiving information transmitted from the monitored side.

The target control information includes a transmit interval and a repeat times, or the target control information includes a transmit interval and a transmit time.

The target control information is set via a CPS, or is set by man-machine interface interaction of a device on the monitoring side.

A system for implementing a remote monitoring between interphones is further provided according to an embodiment of the present invention. The system includes a monitoring side and a monitored side, the monitoring side is configured to transmit a remote monitoring request including target control information; receive acknowledgment information from the monitored side and enter a monitoring state; and receive information transmitted from the monitored side; and the monitored side is configured to receive the remote monitoring request including the target control information from the monitoring side; reply the acknowledgement information to the monitoring side, analyze the target control information and select a transmitting mode; and enter a monitored state, start automatically a transmission, and transmit according to the selected transmitting mode.

A device for implementing a remote monitoring between interphones is further provided according to an embodiment of the present invention. The device is used by a monitored side and includes:

a receiving unit, configured to receive a remote monitoring request from a monitoring side, where the remote monitoring request includes target control information;

an analyzing unit, configured to reply acknowledgment information to the monitoring side, analyze the target control information, and select a transmitting mode; and a transmitting unit, configured to enter a monitored state, start automatically a transmission, and transmit according to the selected transmitting mode.

The target control information includes a transmit interval, and the analyzing unit includes:

an acknowledgement replying sub-unit, configured to reply the acknowledgment information to the monitoring side;

a transmit interval acquiring sub-unit, configured to analyze the target control information, and acquire the transmit interval; and a transmitting mode selecting sub-unit, configured to judge whether the transmit interval is 0, select a first transmitting mode as a current transmitting mode in a case that the transmit interval is 0, and select a second transmitting mode as the current transmitting mode in a case that the transmit interval is not 0.

In a case that the first transmitting mode is selected as the current transmitting mode, a transmit time is acquired from the target control information; and the transmitting unit includes:

a transmitting starting sub-unit, configured to enter the monitored state, start automatically a transmission, and transmit a sound;

a duration recording sub-unit, configured to record a transmitting duration; and a transmitting control sub-unit, configured to judge whether the transmitting duration reaches the transmit time contained in the target control information, end the current transmission in a case that the transmitting duration reaches the transmit time contained in the target control information, and wait and end the current transmission when the transmitting duration reaches the transmit time contained in the target control information in a case that the transmitting duration does not reach the transmit time contained in the target control information.

In a case that the second transmitting mode is selected as the current transmitting mode, the transmit interval and a repeat times are acquired from the target control information; and the transmitting unit includes:

a first transmitting starting sub-unit, configured to enter the monitored state, start automatically a transmission, and transmit a sound;

a duration recording sub-unit, configured to record a transmitting duration;

a first transmitting duration judging sub-unit, configured to judge whether a current transmitting duration reaches a preset first threshold, notify a repetition judging sub-unit in a case that the current transmitting duration reaches the preset first threshold, and wait and notify the repetition judging sub-unit when the current transmitting duration reaches the preset first threshold in a case that the current transmitting duration does not reach the preset first threshold;

the repetition judging sub-unit, configured to judge whether the repeat times is not equal to 0, end in a case that the repeat times is equal to 0, and notify a counting sub-unit in a case that the repeat times is not equal to 0;

the counting sub-unit, configured to add the current transmitting times by 1 to obtain a value of a transmitting times, judge whether the value of the transmitting times obtained is greater than or equal to the repeat times, end in a case that the value of the transmitting times obtained is greater than or equal to the repeat times, and notify a second transmitting starting sub-unit in a case that the value of the transmitting times obtained is not greater than or equal to the repeat times;

the second transmitting starting sub-unit, configured to start to transmit a sound again after waiting for a time period indicated by the transmit interval, and notify a second transmitting duration judging sub-unit; and the second transmitting duration judging sub-unit, configured to judge whether a current transmitting duration reaches the preset first threshold, notify the counting sub-unit in a case that the current transmitting duration reaches the preset first threshold, and wait and notify the counting sub-unit when the current transmitting duration reaches the preset first threshold in a case that the current transmitting duration does not reach the preset first threshold.

A device for implementing a remote monitoring between interphones is further provided according to an embodiment of the present invention. The device is used by a monitoring side and includes:

a transmitting unit, configured to transmit a remote monitoring request, where the remote monitoring request includes target control information;

a monitoring starting unit, configured to receive acknowledgment information replied by a monitored side, and enter a monitoring state; and a monitoring receiving unit, configured to receive information transmitted from the monitored side.

In the embodiments of the present invention, the monitored side selects the transmitting mode by analyzing the target control information in the received monitoring request, and transmits according to the selected transmitting mode. In this way, the monitoring side can actively control the monitoring mode, such as the transmit time or the transmit interval and the transmitting times of the monitored side, so as to realize a periodic monitoring. Additionally, in the method and the system according to the embodiments of the present invention, not only the CPS can be used to set, but also a man-machine interface can be used to set when using, target control information is provided and the transmit time of the monitored side is controlled flexibly.

Therefore, in the embodiments of the present invention, the user can conveniently change the time parameters according to the specific application environment, without completely relying on the CPS to reconfigure the machine, so as to monitor the monitored side in different time. Moreover, some special application scenarios, such as the case where the monitored side is required to automatically report its background to the monitoring side for being monitored by the monitoring side, can be realized.

BRIEF DESCRIPTION OF THE DRAWINGS

The accompanying drawings needed to be used in the description of the embodiments or the prior art will be described briefly as follows, so that the technical solutions according to the embodiments of the present invention or according to the prior art will become clearer. It is obvious that the accompanying drawings in the following description are only some embodiments of the present invention. For those skilled in the art, other accompanying drawings may be obtained according to these accompanying drawings without any creative work.

DETAILED DESCRIPTION OF THE INVENTION

The technical solutions according to the embodiments of the present invention will be described clearly and completely as follows in conjunction with the accompanying drawings in the embodiments of the present invention. It is obvious that the described embodiments are only part of embodiments of the present invention. All other embodiments obtained by those skilled in the art based on the embodiments in the present invention without any creative work belong to the protection scope of the present invention.

A brief description of the structure of CSBK is firstly made below in order to describe this application more clearly.

Figure 1:
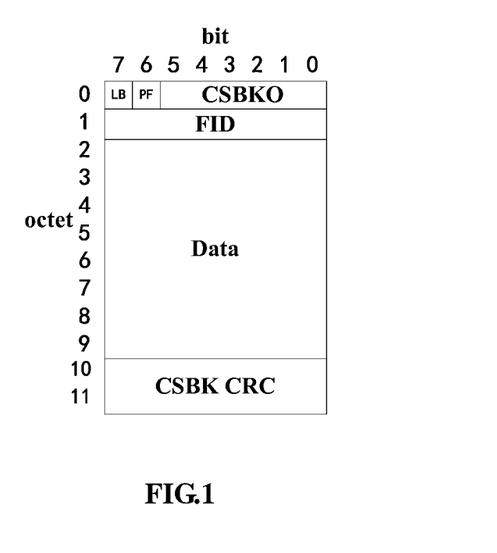
FIG. 1 illustrates a common CSBK information structure defined in the conventional DMR protocol.

FIG. 1 illustrates a common CSBK structure defined in the conventional DMR protocol. Herein, in the embodiment of the invention, the structure of protocol data unit (PDU) for interphone remote monitoring as shown in FIG. 2 and the structure of PDU used when the monitored side replies acknowledgement information (ACK) as shown in FIG. 3 are defined by redesigning and redefining the total 8 bytes of Date field from byte2 to byte9 in conjunction with a custom CSBK opcode (CSBKO).

Figure 2:
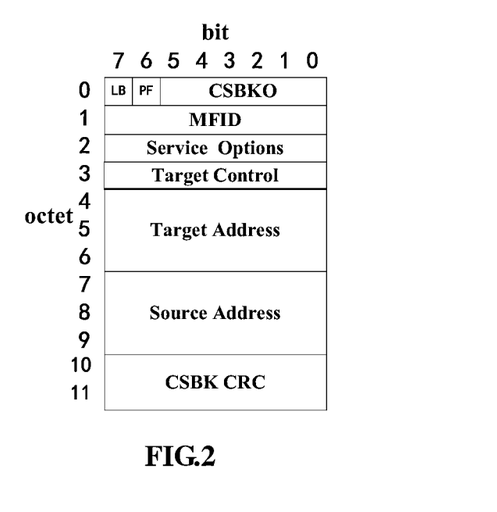
FIG. 2 illustrates a common PDU structure of a remote monitoring request defined in an embodiment of the present invention.
Figure 3:
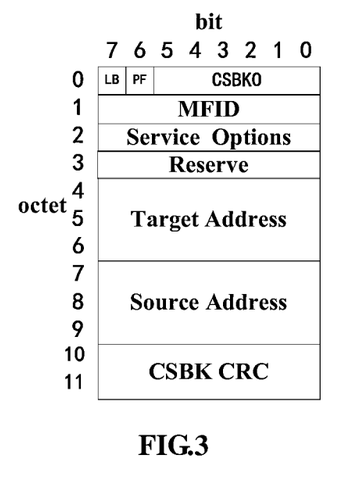
FIG. 3 illustrates a PDU structure used in replying a monitoring request defined in an embodiment of the present invention.

For the remote monitoring request initiated by the monitoring side, a monitoring request PDU is constructed by filling the structure in FIG. 2, and then is transmitted via an air interface after an encoding process inherent in the protocol. The monitored side replies ACK to the monitoring side after successfully receiving the remote monitoring request from the monitoring side, specifically, a request response PDU is constructed by filling the structure in FIG. 3, and then is transmitted via an air interface after an encoding process inherent in the protocol.

Figure 4:
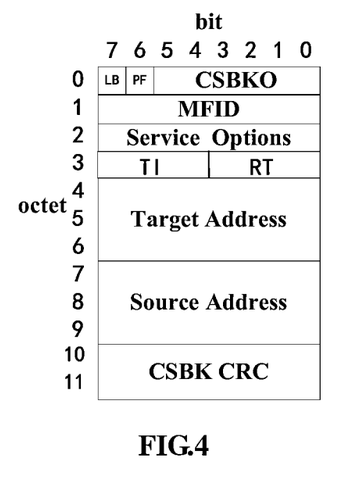
FIG. 4 illustrates a possible PDU structure of a remote monitoring request defined in an embodiment of the present invention.
Figure 5:
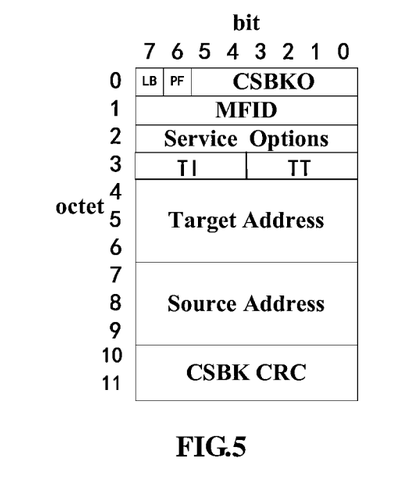
FIG. 5 illustrates another possible PDU structure of a remote monitoring request defined in an embodiment of the present invention.

The structure of the monitoring request as shown in FIG. 2 includes two forms as shown in FIG. 4 and FIG. 5 in implementations.

Referring to FIG. 1 to FIG. 5, meanings of each field in each PDU is briefly described.

In FIG. 1 to FIG. 5, Last Block (LB) has a length of 1 bit and is used to indicate whether the information block is the last block. The detailed description thereof is shown in Table 1.

TABLE 1

| Information unit | length | value | description |
|---|---|---|---|
| Last Block | 1 | $0_2$ | represent a frame header or an intermediate block of multi-block control signaling (MBC) |
| | | $1_2$ | represent the last block of CSBK or MBC |

In FIG. 1 to FIG. 5, Protect Flag (PF) has a length of 1 bit and is reserved for future use. The detailed description thereof is shown in Table 2.

TABLE 2

| Information unit | length | value | description |
|---|---|---|---|
| Protect Flag | 1 | $0_2$ | reserved for future use, and set to be 0 at present |

In FIG. 1 to FIG. 5, Feature set ID (FID) has a length of 8 bits and is used to identify a feature ID. The detailed description thereof is shown in Table 3.

TABLE 3

| Information unit | length | value | Description |
|---|---|---|---|
| Feature set ID (FID) | 8 | $00000000_2$ | a standardized feature ID defined in document TS 102 361-2 [5] (SFID) |
| | | $00000001_2$ | reserved for future standard |
| | | $00000010_2$ | reserved for future standard |
| | | $00000011_2$ | reserved for future standard |
| | | $00000100_2$ | manufacture special feature ID (MFID) |
| | | etc | etc |
| | | $01111111_2$ | manufacture special feature ID (MFID) |
| | | $1xxxxxxx_2$ | manufacture reserved ID (MFID) |

FID is a standard field defined in the protocol, and the field is referred to as manufacture special feature ID (MFID) when used to identify special features of the manufacture.

In FIG. 1 to FIG. 5, Control Signaling Block Opcode (CSBKO) is used to indicate a custom CSBK opcode of a sending request and a custom CSBK opcode of a replied ACK which are used for auxiliary functions. The detailed description thereof is shown in Table 4.

TABLE 4

| Information unit | length | value | Description |
|---|---|---|---|
| Control Signaling Block Opcode | 6 | $101001_2$ | remote monitoring request |
| | | $101100_2$ | remote monitoring response |

In FIG. 2 to FIG. 5, Service Option has a length of 8 bits and is used to indicate a remote monitoring function. The detailed description thereof is shown in Table 5.

TABLE 5

| Information unit | length | value | description |
|---|---|---|---|
| Service Option | 8 | $00001100_2$ | remote monitoring service |

Target Control in FIG. 2 is used to provide the transmitting mode of the monitored side. The mode in FIG. 4 or in FIG. 5 may be adopted in a specific implementation.

Transmit interval in FIG. 4 has a length of 4 bits and is used to indicate the time period of the transmit interval of the monitored side. The detailed description thereof is shown in Table 6.

TABLE 6

| Information unit | length | value | description |
|---|---|---|---|
| Transmit Interval | 4 | 0 | see note 1 |
| | | 1-15 s | time period of transmit interval |

Note 1:
if TI is set to 0, the other 4 bits in this byte do not indicate the repeat times as shown in Table 7, but indicate the transmitting duration as shown in Table 8, and the corresponding PDU is as shown in FIG. 5; this design is to enable the monitored side to identify the meaning of the whole byte.

Repeat Times illustrated in FIG. 4 has a length of 4 bit and is used to indicate the number of transmissions started by the monitored side (the number of times that the monitored side is monitored periodically). The detailed description thereof is shown in Table 7.

TABLE 7

| Information unit | length | value | Description |
|---|---|---|---|
| Repeat Times | 4 | 0-15 | the total number of periodical transmissions |

Transmit time illustrated in FIG. 5 has a length of 4 bit and is used to indicate the duration of each transmission of the monitored side. The detailed description thereof is shown in Table 8.

TABLE 8

| Information unit | length | value | Description |
|---|---|---|---|
| Transmitting Time | 4 | 0-15 | duration of a transmission |

Note:
the value is in unit of second, and 0-15 indicates 0-150 s; the unit may be defined according to actual situation, such as in unit of minute.

Reserve illustrated in FIG. 3 is reserved in the ACK message.

In FIG. 2 to FIG. 5, Target Address is used to record the address of the target side, i.e., the monitored side; and Source Address is used to record the address of the initiator, i.e., the monitoring side.

In FIG. 1 to FIG. 5, CSBK cyclic redundancy check (CRC) is used to check the message received by a message receiver.

Based on the structures of PDU shown in FIG. 2 to FIG. 5, the method for implementing the remote monitoring according to embodiments of the invention will be described below.

Figure 6:
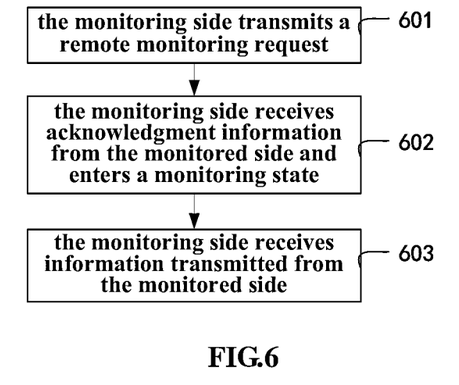
FIG. 6 is a flow chart of implementing a remote monitoring according to an embodiment of the present invention.

FIG. 6 is a flow chart of implementing a remote monitoring according to an embodiment of the present invention. The embodiment is used for a remote monitoring between interphones and is described based on a monitoring side. The embodiment includes the following steps 601 to 603.

Step 601, the monitoring side transmits a remote monitoring request, where the remote monitoring request includes target control information.

The target control information described above includes a transmit interval (TI) and a repeat times (RT), or the target control information includes a transmit interval (TI) and a transmit time (TT).

It should be noted that the target control information described above, i.e., TI and RT, or TI and TT, may be set via customer program software (CPS), or may be set via a man-machine interface interaction of a device on the monitoring side. After the setting, the remote monitoring function may be selected via the man-machine interface, so the monitoring side can construct a PDU of a remote monitoring request based on the above set target control information according to the structure of the CSBK message shown in FIG. 4 or FIG. 5, integrate into a burst block based on the PDU of the remote monitoring request by an encoding process inherent in the protocol, and transmit the burst block through an air interface.

Step 602, the monitoring side receives acknowledgment information such as ACK from the monitored side, and enters a monitoring state.

Step 603, the monitoring side receives information transmitted from the monitored side.

Figure 7:
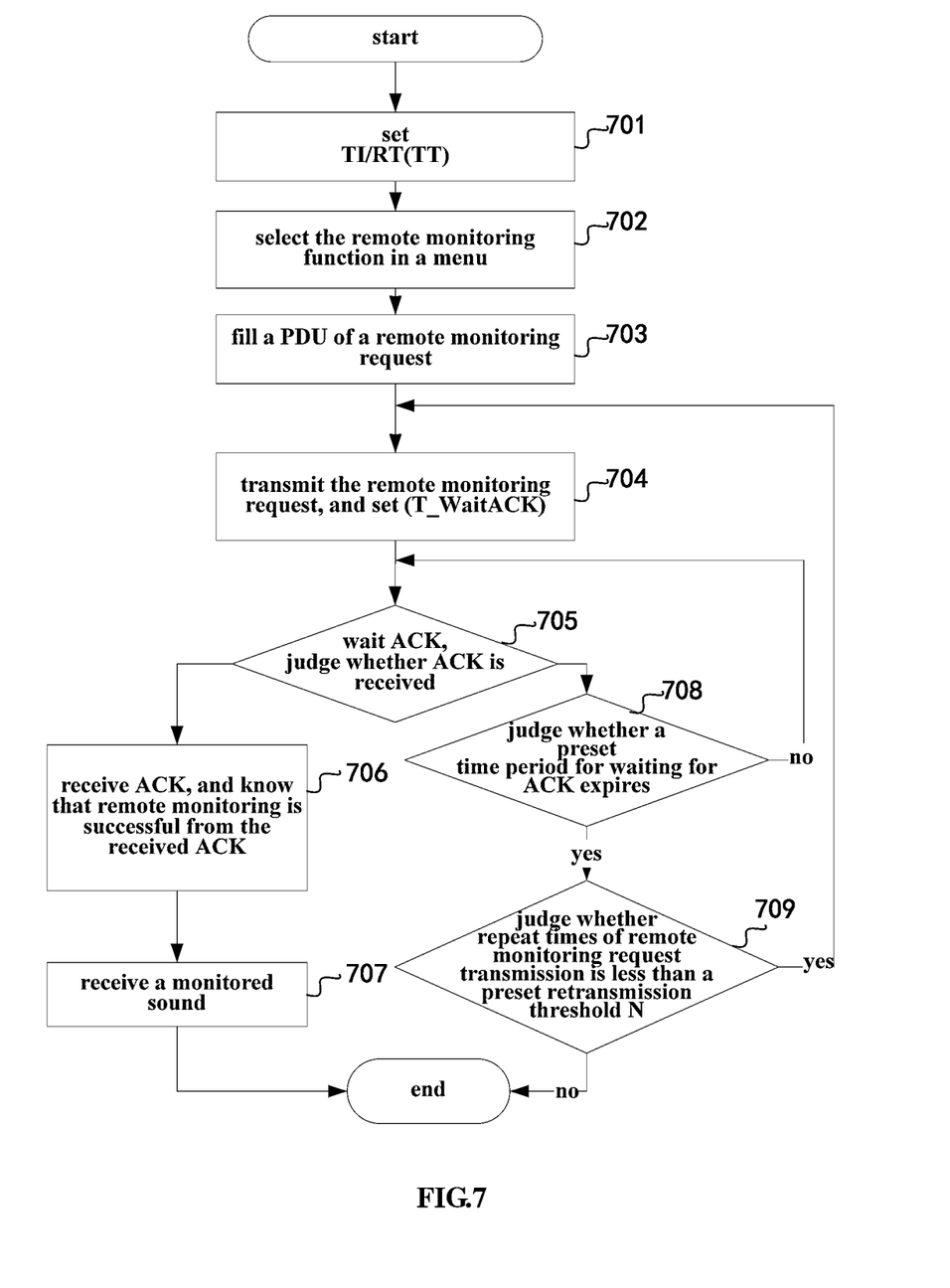
FIG. 7 is a detailed flow chart of implementing the remote monitoring according to an embodiment of the present invention.

FIG. 7 is a detailed flow chart of implementing the remote monitoring according to an embodiment of the present invention. The present embodiment is used for a remote monitoring between interphones and is described based on the monitoring side. The embodiment includes the following steps 701 to 709.

Step 701, setting TI and RT, or TI and TT.

Step 702, selecting the remote monitoring function via a menu provided on a man-machine interface by a device on the monitoring side.

Step 703, filling a remote monitoring request PDU.

Step 704, transmitting the remote monitoring request, and setting a time period for waiting reception of ACK.

Step 705, waiting for reception of ACK and judging whether the ACK is received, performing Step 706 in a case that the ACK is received, and performing Step 709 in a case that the ACK is not received.

Step 706, receiving the ACK, and knowing that the remote monitoring is successful from the received ACK.

Step 707, receiving the monitored sound, and ending.

Step 708, judging whether a preset time period for waiting reception of ACK expires, performing Step 709 in a case that the preset time period for waiting reception of ACK expires, and performing Step 705 in a case that the preset time period for waiting reception of ACK does not expires.

Step 709, judging whether the number of times for transmitting the remote monitoring request is less than a preset retransmission threshold N, performing Step 704 in a case that the number of times for transmitting the remote monitoring request is less than the preset retransmission threshold N, and ending in a case that the number of times for transmitting the remote monitoring request is not less than the preset retransmission threshold N.

Figure 8:
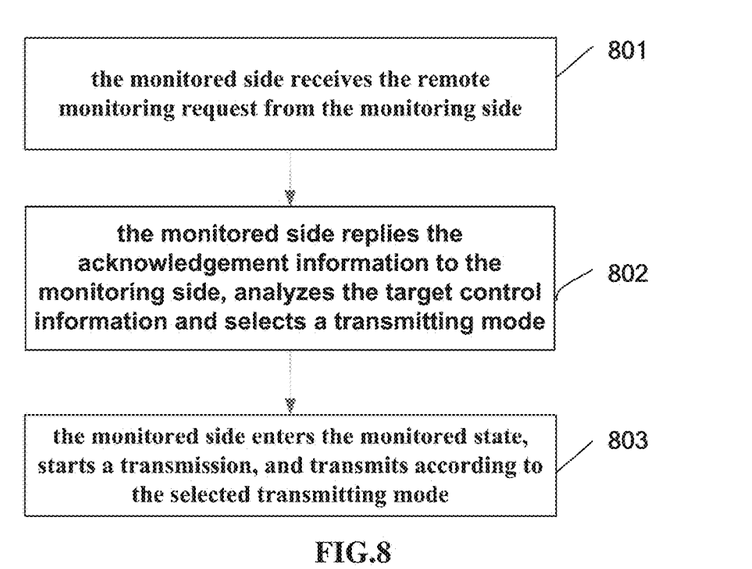
FIG. 8 is a flow chart of implementing another remote monitoring according to an embodiment of the present invention.

FIG. 8 is a flow chart of implementing another remote monitoring according to an embodiment of the present invention. The present embodiment is used for a remote monitoring between interphones and is described based on the monitored side. The embodiment includes the following steps 801 to 803.

Step 801, the monitored side receives a remote monitoring request from the monitoring side, where the remote monitoring request includes target control information.

The target control information described above includes a transmit interval (TI) and a repeat times (RT), or the target control information includes a transmit interval (TI) and a transmit time (TT).

Step 802, the monitored side, after receiving the remote monitoring request successfully, replies acknowledgement information to the monitoring side, analyzes the target control information, and selects a transmitting mode.

The above step that the monitored side analyzes the target control information and selects a transmitting mode may include:

the monitored side analyzes the target control information and acquires the transmit interval; and the monitored side judges whether the transmit interval is 0, selects a first transmitting mode as a current transmitting mode in a case that the transmit interval is 0, and selects a second transmitting mode as the current transmitting mode in a case that the transmit interval is not 0.

That is, if the transmit interval is 0, it is indicated that the monitored side needs not to transmit for several times, and the duration of each transmission may be controlled; and if the transmit interval is not 0, it is indicated that the monitored side may transmit for several times according to the analyzed value of RT.

Step 803, the monitored side enters the monitored state, starts automatically a transmission, and transmits according to the selected transmitting mode.

Figure 9:
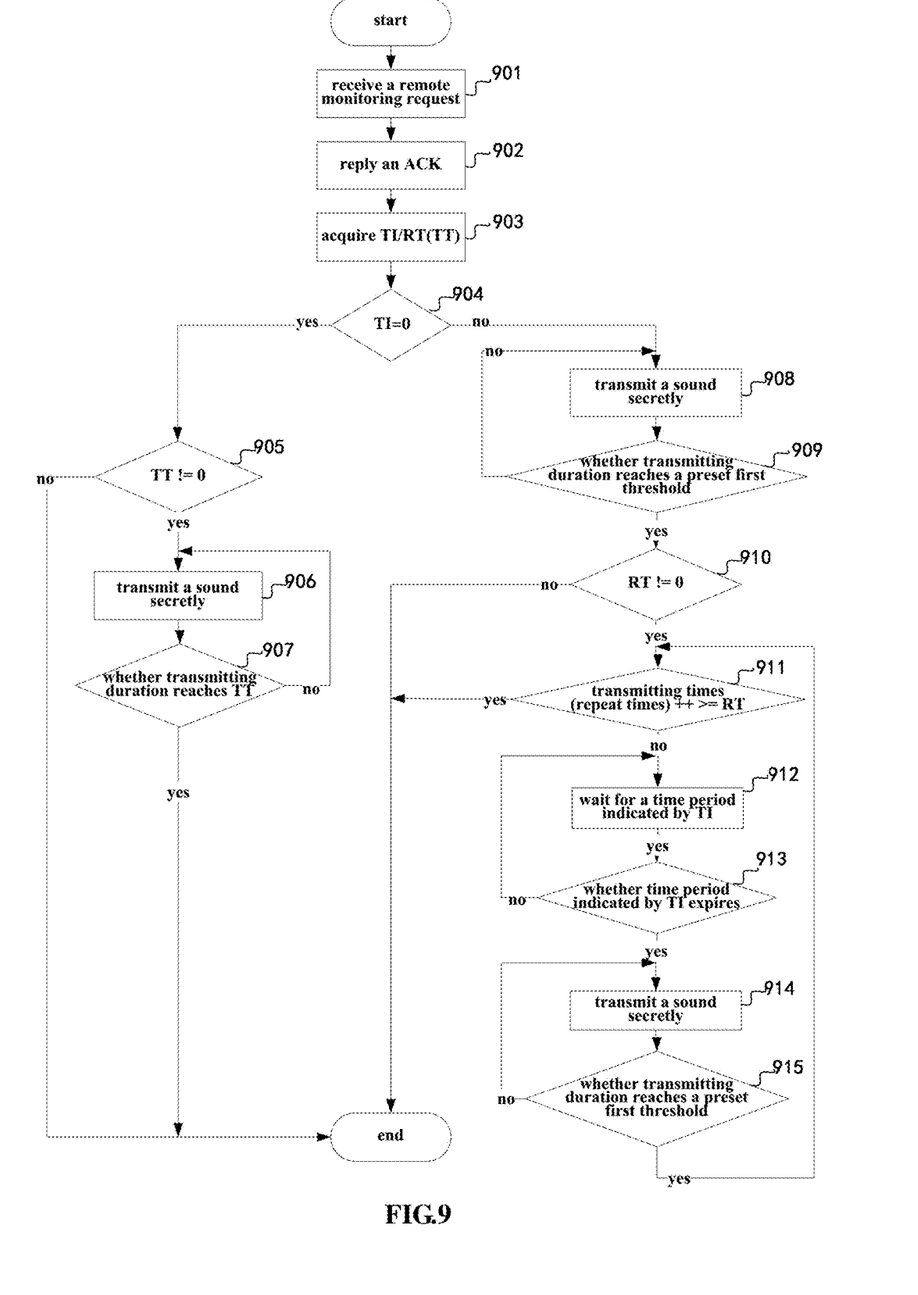
FIG. 9 is a detailed flow chart of implementing the another remote monitoring according to an embodiment of the present invention.

FIG. 9 is a detailed flow chart of implementing the another remote monitoring according to an embodiment of the present invention. The present embodiment is used for a remote monitoring between interphones and is described based on the monitored side. The embodiment includes the following steps 901 to 915.

Step 901, receiving a remote monitoring request including target control information, where the target control information includes TI and RT, or includes TI and TT.

Step 902, replying acknowledgment information (ACK) to the monitoring side.

Step 903, obtaining TI and RT or obtaining TI and TT from the target control information.

Step 904, judging whether TI is equal to 0, performing Step 905 in a case that TI is equal to 0, and performing Step 908 in a case that TI is not equal to 0.

Step 905, judging whether TT is not equal to 0, performing Step 906 in a case that TT is not equal to 0, and ending in a case that TT is equal to 0.

Step 906, transmitting a sound, and recording a transmitting duration.

The transmission is in a secret transmitting state, so the device of the monitored side does not have any transmitting indication, therefore the user being monitored does not know the monitoring.

Step 907, judging whether the transmitting duration reaches TT, ending in a case that the transmitting duration reaches TT, and performing Step 906 in a case that the transmitting duration does not reach TT.

The above steps 905 to 907 are steps performed by the monitored side to transmit according to the first transmitting mode selected as the current transmitting mode. Briefly, the monitored side ends the current transmission in a case that it is judged the transmitting duration reaches the value of TT; and the monitored side waits and ends the current transmission when the transmitting duration reaches the value of TT in a case that it is judged the transmitting duration does not reach the value of TT.

Step 908, transmitting a sound, and recording the transmitting duration.

The transmission is in a secret transmitting state, and the device of the monitored side does not have any transmitting indication, therefore the user being monitored does not know the monitoring.

Step 909, judging whether the transmitting duration reaches a preset first threshold, performing Step 910 in a case that the transmitting duration reaches the preset first threshold, and performing Step 908 in a case that the transmitting duration does not reach the preset first threshold.

The first threshold described above is a preset time period for one transmission, which is typically set when manufactured.

Step 910, judging whether the repeat times is not equal to 0, ending in a case that the repeat times is equal to 0, and performing Step 911 in a case that the repeat times is not equal to 0.

Step 911, adding the current transmitting times by 1 to obtain a value of a transmitting times, judging whether the value of the transmitting times obtained is greater than or equal to RT, ending in a case that the value of the transmitting times obtained is greater than or equal to RT, and performing Step 912 in a case that the value of the transmitting times obtained is not greater than or equal to RT.

Step 912, waiting for a time period indicated by the transmit interval TI.

Step 913, judging whether the time period indicated by TI expires, performing Step 914 in a case that the time period indicated by TI expires, and performing Step 912 in a case that the time period indicated by TI does not expire.

Step 914, transmitting a sound, and recording the transmitting duration.

Step 915, judging whether the current transmitting duration reaches the preset first threshold, performing Step 911 in a case that the current transmitting duration reaches the preset first threshold, and performing Step 914 in a case that the current transmitting duration does not reach the preset first threshold.

The steps 908 to 915 described above are steps performed by the monitored side to transmit according to the second transmitting mode selected as the current transmitting mode. Briefly, when judging that the current transmitting duration reaches the preset first threshold, the monitored side judges whether the repeat times is not equal to 0, adds the current transmitting times by 1 to obtain the value of the transmitting times if the repeat times is not equal to 0, and then judges whether the value of the transmitting times obtained is greater than or equal to the repeat times, and starts to transmit a sound again after waiting for a time period indicated by the transmit interval if the value of the transmitting times obtained is less than the repeat times.

It can be seen that in the method embodiments of the present invention, the monitored side selects the transmitting mode by analyzing the target control information in the received monitoring request, and transmits according to the selected transmitting mode. In this way, the monitoring side can actively control the monitoring mode, such as the transmit time or the transmit interval and times of the monitored side, so as to realize a periodic monitoring. The target control information in the present embodiment takes full use of a CSBK reserve field in the DRM protocol and the remote monitoring PDU is reasonably designed, thereby enhancing the remote monitoring function of the interphone. Additionally, in the method according to the embodiments of the present invention, not only the CPS can be used to set, but also a man-machine interface can be used to set when using, target control information is provided and the transmit time of the monitored side is control flexibly.

The present invention is further described in detail with some possible examples.

The following embodiments take a hand-held terminal used in a direct mode as an example. In practice, it is not limited to the handheld terminal, other communication device such as a vehicle mounted station may also be used to realize the remote monitoring function in a direct mode or a relay mode by using the method set forth in the present invention.

Figure 10:
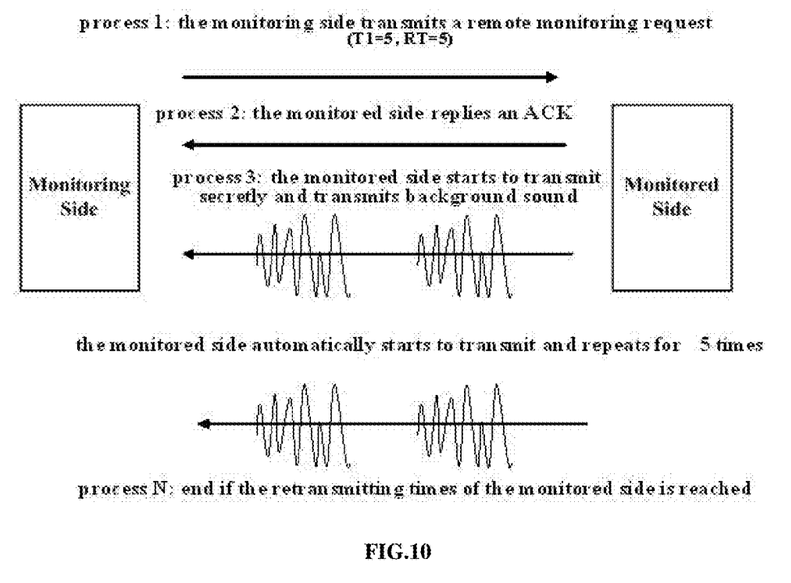
FIG. 10 is a schematic diagram of a possible example according to the present invention.

FIG. 10 is a schematic diagram of a possible example according to the present invention. In the embodiment, the monitoring side wants to control the target interphone (i.e., the monitored side) to automatically start the remote monitoring for 5 times in every 5 minutes. In this case, a time period for one transmission is required to be preset, which is typically preset when manufactured. According to the structure of the PDU of the remote monitoring request in FIG. 4, TI is set to be 5 (the set manner is selected according to actual requirement: it may be set via the CPS in advance, or set by an operation on a man-machine interface when using), which indicates that the time period of the transmit interval of the target interphone is controlled to be 5 minutes. RT is set to be 5, which indicates that the target interphone is controlled to repeat 5 times. The description of other elements is omitted herein. Then the PDU of the remote monitoring request is constructed and is transmitted via an air interface after an encoding process inherent in the protocol. The target interphone replies an ACK after decoding, and then secretly starts the transmissions which are controlled by parameters of TI and RT, to achieve automatic and periodic transmissions.

Figure 11:
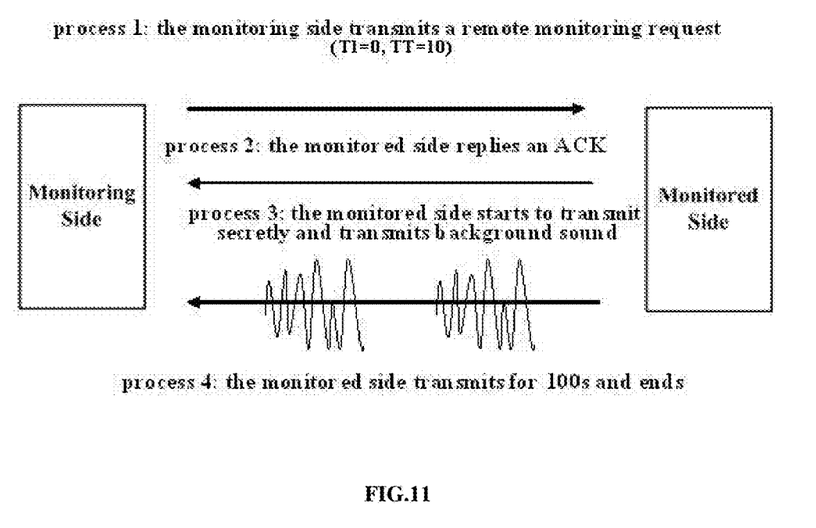
FIG. 11 is a schematic diagram of another possible example according to the present invention.

FIG. 11 is a schematic diagram of another possible example according to the present invention. In the embodiment, the monitoring side wants to control the target interphone (i.e., the monitored side) to transmit for 100s, that is, the monitoring side wants to monitor for 100s. In this case, according to the remote monitoring PDU in FIG. 5, TI is set to be 0 and TT is set to be 10 via a man-machine operation interface. Then PDU of a remote monitoring request is constructed and is transmitted via an air interface after an encoding process inherent in the protocol. The target interphone replies an ACK after decoding, secretly starts to transmit for 100s, and then ends the process. In this example, the range of the time period for monitoring that can be selected by the user is shown in Table 8. In this way, the time period for monitoring can be controlled flexibly.

Figure 12:
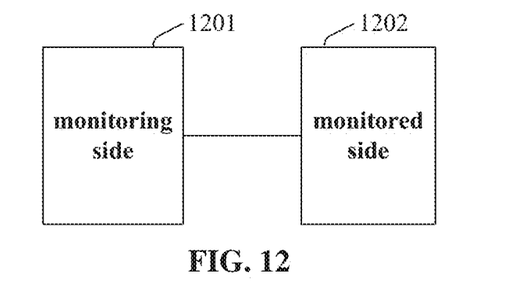
FIG. 12 is a logical structural schematic diagram of a system for implementing a remote monitoring according to an embodiment of the present invention.

A system for implementing a remote monitoring between interphones is further provided according to an embodiment of the present invention. Referring to FIG. 12, the system includes a monitoring side 1201 and a monitored side 1202.

The monitoring side 1201 is configured to transmit a remote monitoring request including target control information; receive acknowledgment information from the monitored side and enter a monitoring state; and receive information transmitted from the monitored side.

The monitored side 1202 is configured to receive the remote monitoring request including the target control information from the monitoring side; reply the acknowledgement information to the monitoring side, analyze the target control information and select a transmitting mode; and enter a monitored state, start to transmit, and transmit according to the selected transmitting mode.

The above target control information includes a transmit interval and a repeat times, or the target control information includes a transmit interval and a transmit time.

In the system embodiment of the present invention, the monitored side selects a transmitting mode by analyzing the target control information in the received monitoring request, and transmits according to the selected transmitting mode. In this way, the monitoring side can actively control the monitoring manners, such as the transmit time or the transmit interval and times of the monitored side, so as to realize a periodic monitoring. The target control information in the embodiments takes full use of the CSBK reserve field in the DRM protocol and the remote monitoring PDU is reasonably designed, thereby enhancing the remote monitoring function of the interphone. Additionally, in the method according to the embodiment of the present invention, not only the CPS can be used to set, but also the man-machine interface can be used to set when using, a target control information is provide and the transmit time of the monitored side is controlled flexibly.

Figure 13:
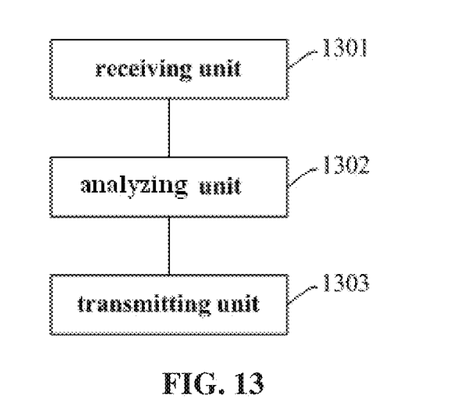
FIG. 13 is a logical structural schematic diagram of a device used by a monitored side according to an embodiment of the present invention.

A device for implementing a remote monitoring between interphones is further provided according to an embodiment of the present invention, which is used by the monitored side. Referring to FIG. 13, the device includes:

a receiving unit 1301, configured to receive a remote monitoring request from a monitoring side, where the remote monitoring request includes target control information;

an analyzing unit 1302, configured to reply acknowledgment information to the monitoring side, analyze the target control information, and select a transmitting mode; and a transmitting unit 1303, configured to enter a monitored state, start automatically a transmission, and transmit according to the selected transmitting mode.

The above target control information includes a transmit interval. In this case, the analyzing unit 1302 includes (not illustrated in the figures):

an acknowledgement replying sub-unit, configured to reply the acknowledgment information to the monitoring side;

a transmit interval acquiring sub-unit, configured to analyze the target control information, and acquire the transmit interval; and a transmitting mode selecting sub-unit, configured to judge whether the transmit interval is 0, select a first transmitting mode as a current transmitting mode in a case that the transmit interval is 0, and select a second transmitting mode as the current transmitting mode in a case that the transmit interval is not 0.

In a case that the first transmitting mode is selected as the current transmitting mode, a transmit time is acquired from the target control information; and the transmitting unit includes (not illustrated in the figures):

a transmitting starting sub-unit, configured to enter the monitored state, start automatically a transmission, and transmit a sound;

a duration recording sub-unit, configured to record a transmitting duration; and a transmitting control sub-unit, configured to judge whether the transmitting duration reaches the transmit time contained in the target control information, end the current transmission in a case that the transmitting duration reaches the transmit time contained in the target control information, and wait and end the current transmission when the transmitting duration reaches the transmit time contained in the target control information in a case that the transmitting duration does not reach the transmit time contained in the target control information.

In a case that the second transmitting mode is selected as the current transmitting mode, the transmit interval and a repeat times are acquired from the target control information; and the transmitting unit includes (not illustrated in the figures):

a first transmitting starting sub-unit, configured to enter the monitored state, start automatically a transmission, and transmit a sound;

a duration recording sub-unit, configured to record a transmitting duration;

a first transmitting duration judging sub-unit, configured to judge whether a current transmitting duration reaches a preset first threshold, notify a repetition judging sub-unit in a case that the current transmitting duration reaches the preset first threshold, and wait and notify the repetition judging sub-unit when the current transmitting duration reaches the preset first threshold in a case that the current transmitting duration does not reach the preset first threshold;

the repetition judging sub-unit, configured to judge whether the repeat times is not equal to 0, end in a case that the repeat times is equal to 0, and notify a counting sub-unit in a case that the repeat times is not equal to 0;

the counting sub-unit, configured to add a current transmitting times by 1 to obtain a value of a transmitting times, and judge whether the value of the transmitting times obtained is greater than or equal to the repeat times, end in a case that the value of the transmitting times obtained is greater than or equal to the repeat times, and notify a second transmitting starting sub-unit in a case that the value of the transmitting times obtained is not greater than or equal to the repeat times;

the second transmitting starting sub-unit, configured to start to transmit a sound again after waiting for a time period indicated by the transmit interval, and then notify a second transmitting duration judging sub-unit; and the second transmitting duration judging sub-unit, configured to judge whether the current transmitting duration reaches the preset first threshold, notify the counting sub-unit in a case that the current transmitting duration reaches the preset first threshold, and wait and notify the counting sub-unit when the current transmitting duration reaches the preset first threshold in a case that the current transmitting duration does not reach the preset first threshold.

Figure 14:
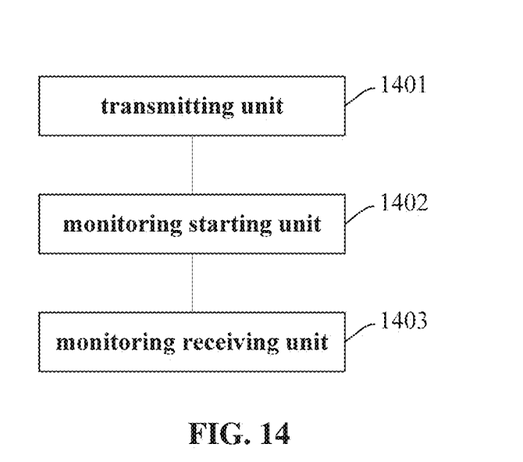
FIG. 14 is a logical structural schematic diagram of a device used by a monitored side according to an embodiment of the present invention.

A device for implementing a remote monitoring between interphones is further provided according to an embodiment of the present invention, which is used by the monitoring side. Referring to FIG. 14, the device includes:

a transmitting unit 1401, configured to transmit a remote monitoring request, where the remote monitoring request includes target control information;

a monitoring starting unit 1402, configured to receive acknowledgment information replied from a monitored side, and enter a monitoring state; and a monitoring receiving unit 1403, configured to receive information transmitted from the monitored side.

In the device embodiments of the present invention, the monitored side selects a transmitting mode by analyzing the target control information in the received monitoring request, and transmits according to the selected transmitting mode. In this way, the monitoring side can actively control the monitoring manner, such as the transmit time or the transmit interval and times of the monitored side, so as to realize a periodic monitoring. The target control information in the embodiments takes full use of the CSBK reserve field in the DRM protocol and the remote monitoring PDU is reasonably designed, thereby enhancing the remote monitoring function of the interphone. Additionally, in the method according to the embodiments of the present invention, not only the CPS can be used to set, but also a man-machine interface can be used to set when using, target control information is provided and the transmit time of the monitored side is controlled flexibly.

The embodiments of the device and system are described simply because they are substantially similar to the embodiments of the method. The relevant portion may refer to the corresponding description of the embodiments of the method.

It should be noted that, the relationship terminologies such as first and second are only used herein to distinguish an entity or operation from another entity or operation, and it is not necessarily required or implied that there are any actual relationship or order of this kind between those entities and operations. Moreover, the terminologies of 'comprise', 'include', and any other variants are intended to cover the non-exclusive contains so that the processes, methods, articles or equipment including a series of elements not only include those elements but also include other elements that are not listed definitely or also include the elements inherent in the processes, methods, articles or equipment. In the case of no more restrictions, the elements defined by the statement 'include a . . . ' do not exclude that other same elements also exist in the processes, methods, articles or equipment including the elements.

It will be appreciated by those skilled in the art that all or part of the steps in the embodiments of the above methods can be realized by instructing related hardware by a program that may be stored in the computer-readable storage medium such as ROM/RAM, magnetic disc and optical disc.

What is described above is only the preferable embodiments of the present invention and are not intended to define the scope of protection of the present invention. Any changes, equivalent substitution or improvement made within the spirit and principles of the present invention are all contained in the scope of protection of the present invention.

The invention claimed is:

1. A method for implementing a remote monitoring between interphones, which is performed by a monitored apparatus, comprising:
   receiving a remote monitoring request from a monitoring apparatus, wherein the remote monitoring request comprises target control information;
   replying acknowledgement information to the monitoring apparatus, analyzing the target control information to acquire a transmit interval and selecting a transmitting mode for transmitting to the monitoring apparatus from a first transmitting mode and a second transmitting mode according to the transmit interval; and
   entering a monitored state, starting a transmission, and transmitting to the monitoring apparatus according to the selected transmitting mode,
   wherein, the target control information comprises the transmit interval, and the analyzing the target control information to acquire a transmit interval and selecting the transmitting mode comprises:
   judging whether the transmit interval is 0, selecting the first transmitting mode as a current transmitting mode in a case that the transmit interval is 0, and selecting the second transmitting mode as the current transmitting mode in a case that the transmit interval is not 0;
   in a case that the second transmitting mode is selected as the current transmitting mode, a repeat times indicating a number of transmissions started by the monitored apparatus is acquired from the target control information, and the transmitting to the monitoring apparatus according to the selected transmitting mode is performed according to a transmitting duration and the repeat times.

2. The method according to claim 1, wherein in a case that the first transmitting mode is selected as the current transmitting mode, a transmit time is acquired from the target control information; and
   the transmitting to the monitoring apparatus according to the selected transmitting mode comprises:
   transmitting a sound;
   recording a transmitting duration; and
   judging whether the transmitting duration reaches the transmit time contained in the target control information, ending the current transmission in a case that the transmitting duration reaches the transmit time contained in the target control information, and waiting and ending the current transmission when the transmitting duration reaches the transmit time contained in the target control information in a case that the transmitting duration does not reach the transmit time contained in the target control information.

3. The method according to claim 1, wherein in a case that the second transmitting mode is selected as the current transmitting mode,
   the transmitting to the monitoring apparatus according to the selected transmitting mode comprises:
   i) transmitting a sound;
   ii) recording a transmitting duration;
   iii) judging whether the current transmitting duration reaches a preset first threshold, performing step iv) in a case that the current transmitting duration reaches the preset first threshold, and waiting and performing step iv) when the current transmitting duration reaches the preset first threshold in a case that the current transmitting duration does not reach the preset first threshold;
   iv) judging whether the repeat times is not equal to 0, ending in a case that the repeat times is equal to 0, and performing step v) in a case that the repeat times is not equal to 0;
   v) adding a current transmitting times by 1 to obtain a value of a transmitting times, judging whether the value of the transmitting times obtained is greater than or equal to the repeat times, ending in a case that the value of the transmitting times obtained is greater than or equal to the repeat times, and performing step vi) in a case that the value of the transmitting times obtained is not greater than or equal to the repeat times;
   vi) starting to transmit a sound again after waiting for a time period indicated by the transmit interval, and performing step vii); and
   vii) judging whether a current transmitting duration reaches the preset first threshold, performing step v) in a case that the current transmitting duration reaches the preset first threshold, and waiting and performing step v) when the current transmitting duration reaches the preset first threshold in a case that the current transmitting duration does not reach the preset first threshold.

4. A method for implementing a remote monitoring between interphones, which is performed by a monitoring apparatus, comprising:
   transmitting a remote monitoring request to a monitored apparatus, wherein the remote monitoring request comprises target control information comprising a transmit interval to control the monitored apparatus to select a transmitting mode for transmitting information to the monitoring apparatus from a first transmitting mode and a second transmitting mode according to the transmit interval;

receiving acknowledgement information replied by a monitored apparatus and entering a monitoring state; and receiving the information transmitted from the monitored apparatus according to the transmitting mode selected by the monitored apparatus, in a case that the second transmitting mode is selected as the current transmitting mode, a repeat times indicating a number of transmissions started by the monitored apparatus is comprised in the target control information, and the information is transmitted from the monitored apparatus according to a transmitting duration and the repeat times.

5. The method according to claim 4, wherein the target control information is set via a customer program software (CPS), or is set by man-machine interface interaction of a device on the monitoring apparatus.

6. A system for implementing a remote monitoring between interphones, comprising a monitoring apparatus and a monitored apparatus, wherein the monitoring apparatus is configured to:

transmit a remote monitoring request to a monitored apparatus; wherein the remote monitoring request comprises target control information comprising a transmit interval to control the monitored apparatus to select a transmitting mode for transmitting information to the monitoring apparatus from a first transmitting mode and a second transmitting mode according to the transmit interval;

receive acknowledgment information from the monitored apparatus and enter a monitoring state; and receive the information transmitted from the monitored apparatus according to the transmitting mode selected by the monitored apparatus; and the monitored apparatus is configured to:

receive the remote monitoring request comprising the target control information from the monitoring apparatus;

reply the acknowledgement information to the monitoring apparatus, analyze the target control information to acquire the transmit interval and select the transmitting mode according to the transmit interval; and enter a monitored state, start a transmission and transmit to the monitoring apparatus according to the selected transmitting mode, wherein, the target control information comprises the transmit interval, and the monitored apparatus is further configured to judge whether the transmit interval is 0, to select the first transmitting mode as a current transmitting mode in a case that the transmit interval is 0, and select the second transmitting mode as the current transmitting mode in a case that the transmit interval is not 0, to analyze the target control information to acquire a transmit interval and to select the transmitting mode;

in a case that the second transmitting mode is selected as the current transmitting mode, a repeat times indicating a number of transmissions started by the monitored apparatus is acquired from the target control information, and the monitored apparatus is configured to transmit to the monitoring apparatus according to a transmitting duration and the repeat times.

7. A device for implementing a remote monitoring between interphones, which is used by a monitored apparatus, the device comprising a processor which is configured to:

receive a remote monitoring request from a monitoring apparatus, wherein the remote monitoring request comprises target control information;

reply acknowledgment information to the monitoring apparatus, analyze the target control information to acquire a transmit interval and select a transmitting mode for transmitting to the monitoring apparatus from a first transmitting mode and a second transmitting mode according to the transmit interval; and enter a monitored state, start a transmission and transmit to the monitoring apparatus according to the selected transmitting mode, wherein the target control information comprises the transmit interval; and the processor is configured to:

judge whether the transmit interval is 0, select the first transmitting mode as a current transmitting mode in a case that the transmit interval is 0, and select the second transmitting mode as the current transmitting mode in a case that the transmit interval is not 0, in a case that the second transmitting mode is selected as the current transmitting mode, a repeat times indicating a number of transmissions started by the monitored apparatus is acquired from the target control information, and the processor is configured to transmit to the monitoring apparatus according to a transmitting duration and the repeat times.

8. The device according to claim 7, wherein in a case that the first transmitting mode is selected as the current transmitting mode, a transmit time is acquired from the target control information, and the processor is configured to:

enter the monitored state, start a transmission, and transmit a sound;

record a transmitting duration; and judge whether the transmitting duration reaches the transmit time contained in the target control information, end the current transmission in a case that the transmitting duration reaches the transmit time contained in the target control information, and wait and end the current transmission when the transmitting duration reaches the transmit time contained in the target control information in a case that the transmitting duration does not reach the transmit time contained in the target control information.

9. The device according to claim 7, wherein in a case that the second transmitting mode is selected as the current transmitting mode, the processor is configured to perform:

i) transmitting a sound;

ii) recording a transmitting duration;

iii) judging whether the current transmitting duration reaches a preset first threshold, performing step iv) in a case that the current transmitting duration reaches the preset first threshold, and waiting and performing step iv) when the current transmitting duration reaches the preset first threshold in a case that the current transmitting duration does not reach the preset first threshold;

iv) judging whether the repeat times is not equal to 0, ending in a case that the repeat times is equal to 0, and performing step v) in a case that the repeat times is not equal to 0;

v) adding a current transmitting times by 1 to obtain a value of a transmitting times, judging whether the value of the transmitting times obtained is greater than or equal to the repeat times, ending in a case that the value of the transmitting times obtained is greater than or equal to the repeat times, and performing step vi) in a case that the value of the transmitting times obtained is not greater than or equal to the repeat times;

vi) starting to transmit a sound again after waiting for a time period indicated by the transmit interval, and performing step vii); and vii) judging whether a current transmitting duration reaches the preset first threshold, performing step v) in a case that the current transmitting duration reaches the preset first threshold, and waiting and performing step v) when the current transmitting duration reaches the preset first threshold in a case that the current transmitting duration does not reach the preset first threshold.

10. A device for implementing a remote monitoring between interphones, which is used by a monitoring apparatus, the device comprising a processor which is configured to:

transmit a remote monitoring request to a monitored apparatus, wherein the remote monitoring request comprises target control information comprising a transmit interval to control the monitored apparatus to select a transmitting mode for transmitting information to the monitoring apparatus from a first transmitting mode and a second transmitting mode according to the transmit interval;

receive acknowledgment information replied by a monitored apparatus, and enter a monitoring state; and receive the information transmitted from the monitored apparatus according to the transmitting mode selected by the monitored apparatus, wherein, in a case that the second transmitting mode is selected as the transmitting mode, a repeat times indicating a number of transmissions started by the monitored apparatus is comprised in the target control information, and the information is transmitted from the monitored apparatus according to a transmitting duration and the repeat times.

* * * * *